(12) United States Patent
Ketterer et al.

(10) Patent No.: US 11,245,873 B2
(45) Date of Patent: Feb. 8, 2022

(54) METHOD AND CAMERA SYSTEM FOR MONITORING A PACKAGING PROCESS

(71) Applicant: Robert Bosch GmbH, Stuttgart (DE)

(72) Inventors: Darno Alexander Ketterer, Renningen (DE); Ulrich Selinger, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/978,983

(22) PCT Filed: Mar. 1, 2019

(86) PCT No.: PCT/EP2019/055199
§ 371 (c)(1),
(2) Date: Sep. 8, 2020

(87) PCT Pub. No.: WO2019/174938
PCT Pub. Date: Sep. 19, 2019

(65) Prior Publication Data
US 2021/0076005 A1     Mar. 11, 2021

(30) Foreign Application Priority Data

Mar. 12, 2018 (DE) .......................... 102018203646.2

(51) Int. Cl.
| | |
|---|---|
| *G06T 7/60* | (2017.01) |
| *H04N 7/18* | (2006.01) |
| *G01B 11/22* | (2006.01) |
| *G01G 19/00* | (2006.01) |
| *G05B 19/4155* | (2006.01) |
| *G06Q 50/28* | (2012.01) |

(52) U.S. Cl.
CPC ............... *H04N 7/18* (2013.01); *G01B 11/22* (2013.01); *G01G 19/00* (2013.01); *G05B 19/4155* (2013.01); *G06Q 50/28* (2013.01); *G06T 7/60* (2013.01); *G05B 2219/45048* (2013.01); *G06T 2207/30242* (2013.01)

(58) Field of Classification Search
None
See application file for complete search history.

(56) References Cited

U.S. PATENT DOCUMENTS

| 7,689,465 B1 | 3/2010 | Shakes et al. |
| 9,299,013 B1 * | 3/2016 | Curlander ................. G06T 7/60 |

(Continued)

FOREIGN PATENT DOCUMENTS

EP     1440920 A2     7/2004

OTHER PUBLICATIONS

International Search Report for PCT/EP2019/055199, dated Apr. 25, 2019.

*Primary Examiner* — Eileen M Adams
(74) *Attorney, Agent, or Firm* — Norton Rose Fulbright US LLP; Gerard Messina

(57) ABSTRACT

A method for monitoring a packaging process of at least one article. In the method, a sort of an article is acquired before it is placed in a transport container. At least one image and at least one depth measurement of the article are recorded after it is placed in the transport container. The three-dimensional dimensions of the article are calculated and are compared with a specification for the acquired sort of the article. If the dimensions of the article do not agree with the specification, a warning is issued.

8 Claims, 4 Drawing Sheets

(56) References Cited

U.S. PATENT DOCUMENTS

| | | | |
|---|---|---|---|
| 9,460,524 B1* | 10/2016 | Curlander | G01F 22/00 |
| 2005/0178481 A1* | 8/2005 | Rashnikov | B21B 37/00 |
| | | | 148/508 |
| 2006/0290472 A1* | 12/2006 | Onderko | G06K 7/10336 |
| | | | 340/10.1 |
| 2009/0249749 A1* | 10/2009 | Schill | A22C 25/04 |
| | | | 53/435 |
| 2017/0217620 A1 | 8/2017 | Zeilstra | |
| 2018/0068139 A1 | 3/2018 | Aalund et al. | |

\* cited by examiner

METHOD AND CAMERA SYSTEM FOR MONITORING A PACKAGING PROCESS

FIELD

The present invention relates to a method for monitoring a packaging process of at least one article. In addition, the present invention relates to a computer program that is set up to carry out steps of the method, as well as to a machine-readable storage medium on which the computer program is stored. In addition, the present invention relates to a camera system that is set up to carry out steps of the method. Finally, the present invention relates to an electronic control device that is set up to monitor a packaging process of at least one article using the method, as well as to a monitoring system for monitoring a packaging process, having a camera system and an electronic control device.

BACKGROUND INFORMATION

In a distribution center, at stationary work stations, packaged articles are packaged in transport units by employees. The packaged articles must be entered into a WMS (Warehouse Management System), with product number, quantity, and further information.

For this purpose, the employee identifies the article and the packaging quantity by visually inspecting the label. If the product number is present on the label as a barcode, then the barcode is acquired using a hand scanner, instead of visually. Subsequently, the employee manually counts the number of packagings of this article, and enters the quantity in the WMS.

If additional information, such as manufacturing date, batch number, or serial number, is to be acquired, this information is read from the label by the employee and is also entered in the WMS. Individually, this information is given on a separate barcode on the label that can be acquired by a hand scanner. This manual acquisition of information concerning the packaged articles in the WMS represents a large part of the overall work that goes into the packaging of articles for transport.

Following the identification and the counting, the employee packages the products into the transport unit. This step is not further acquired in the WMS. Because the packaging process is the final step in the supply chain, errors that occur due to human acquisition of the data, such as quantity errors (oversupplying or undersupplying) and identification errors (supplying the wrong product) are first discovered only by the customer.

SUMMARY

In accordance with an example embodiment of the present invention, in the method for monitoring a packaging process of at least one article, the sort of an article is acquired before it is placed in a transport container. In the simplest case, this can be done by inputting the sort into a warehouse management system (WMS). This can be done for example by manual input or by reading a barcode or QR code attached to the article. In addition, a method may also be used in which a plurality of images of the article in movement are recorded using a plurality of cameras. Here, one or more labels in the images are read, which includes both the identification of one-dimensional and two-dimensional barcodes and QR codes and also of texts and graphic logos. The read labels are compared in particular with specifications from a picking list that contains the type of the article with its identifying features and the quantity of the article to be packaged. The sort of the article can be identified on the basis of the result of this comparison over all known identifying features of the article.

After the article has been placed in the transport container, at least one image and at least one depth measurement of the article are recorded. For the recording of the image, one or more cameras can be situated above the transport container. The depth measurement enables a three-dimensional acquisition and measuring of the article whose image was recorded. In various specific embodiments of the method, the camera used to record the image is realized as a depth camera, a time-of-flight camera, or as a stereo camera. In another specific embodiment of the present invention, as depth sensor a laser is provided that can be installed directly in the camera or can also be positioned locally outside it.

From, or on the basis of, the recorded data, i.e., based on the recorded image and/or the at least one depth measurement of the article, the three-dimensional dimensions of the article are calculated. These dimensions are compared with a specification for the identified sort of the article, which can be stored in the warehouse management system. Here, the specifications correspond to the dimensions of a single packaged article or to a multiple of these dimensions. A warning is issued if the dimensions of the article do not agree with the specification.

In this way, a shipping employee can be made aware that the packaged article does not correspond to the specified sort, and is therefore to be removed from the transport container. In this way, the method prevents the packaging of articles that are not to be placed in the transport container.

Preferably, the recorded data, i.e., the recorded image and/or the at least one depth measurement of the article, are also used to acquire a three-dimensional position of the placement of the article in the transport container. This is linked with an identification code, or a tracking ID. In this way, the article can be registered at a defined position in the transport container. If a plurality of articles are put in place at the same time, then a placement position and an identification code are assigned to each individual article.

In addition, it is preferable that the placement position of the article in the transport container be continuously monitored by at least one camera. In this way, subsequent manipulations of the contents of the transport container can be recognized. If the monitoring of the placement position shows that the placement position has changed, then it suffices simply to link the changed position with the identification code of the article in order to enable this changed position to be subject to further monitoring. Such a change of position may occur for example if a shipping employee determines that the current configuration of articles in the transport container prevents the placement of the next article in the container, and the employee therefore rearranges the articles in the container.

In the case of such a rearrangement of articles in the transport container, it may occur that individual articles temporarily cannot be monitored because a line of sight between the article and the at least one camera is temporarily interrupted. This may occur on the one hand due to the hands of the employee and on the other hand due to other articles that are temporarily moved between the monitored articles and the camera. As soon as the line of sight to the acquired placement position of the article is again free, it is preferably checked whether the article is still situated at its placement position linked with the identification code. If this is not the case, and a change of position of the article is recognized, then the changed placement position can be linked with the identification code.

The continuous monitoring of the contents of the transport container can also have the result that an article placed in the container is removed from the container. This removal may occur in the field of view of the camera. However, a removal can also be recognized if the line of sight between the acquired placement position of the article and the at least one camera has been temporarily interrupted, and, after the line of sight is restored, the article can no longer be found. In both cases, it is preferred that a communication to a warehouse management system take place. This system may then introduce various measures. One possible measure is merely to delete the article from a list of packaged articles, so that a shipping employee can be alerted, possibly in automated fashion, that this article has to be packed again before the packaging process can be completed. Another measure can be to trigger an alarm for monitoring personnel in order to alert them to possible theft by the shipping employee.

After checking whether the correct sort of article was placed in the transport container, the method also enables checking of the packaged quantity. For this purpose, a quantity of the article is preferably ascertained from the dimensions, and this quantity is compared with a specification. A warning is issued if the total quantity packed in the transport container exceeds a provided shipping quantity.

In addition, a weight of the transport container is preferably measured before and after the placement of the article in the container. This can be done in particular using a scale on which the container is situated. The difference in the measured weights yields the weight of the article placed in the transport container. This weight is compared with a specification for the sort of stored article. In this way, it can be recognized when an empty packaging of the article is placed in the transport container that would not be distinguishable from a filled package on the basis of its three-dimensional dimensions.

The computer program enables the implementation of different specific embodiments of the method on a computing device or electronic control device without having to make constructive changes thereto. For this purpose, it is stored on the machine-readable storage medium.

The camera system has at least one camera that has a depth sensor. It is set up at least to record at least one image and at least one depth measurement of the article after its placement in the transport container, and to calculate the three-dimensional dimensions of the article. Such a camera system makes it possible to carry out steps of the method outside the central computing device or electronic control device, and thus, through preprocessing of images and the results of the depth measurement, to reduce the demands on bandwidth or latency of a network that is used, and to increase the transmission speed. In particular, the camera system is a system set up for image preprocessing and postprocessing. While preprocessing can include, for example, functions for filtering and presorting images, postprocessing includes for example functions for image optimization, distortion and moiré optimization, and for the resolution of image sizes and image format adjustment.

The electronic control device is set up to monitor a packaging process of articles using the method. Not all method steps need be carried out in the electronic control device itself. If some method steps are carried out in the camera system, then the electronic control device merges only the information from the carried-out method steps, and in particular carries out the still-missing method steps using the computer program.

The monitoring system for monitoring a packaging process of at least one article has a camera system having at least one camera that has a depth sensor and an electronic control device that is set up to monitor a packaging process of at least one article using the method. Here, the camera system is set up at least to record at least one image and at least one depth measurement of the article after its placement in the transport container, and to calculate the three-dimensional dimensions of the article.

However, the method can also be carried out without using a central electronic control device. In this case, the computer program is executed for example in a cloud.

BRIEF DESCRIPTION OF THE DRAWINGS

Exemplary embodiments of the present invention are shown in the figures and are explained in more detail in the description below.

DETAILED DESCRIPTION OF EXAMPLE EMBODIMENTS

Figure 1:
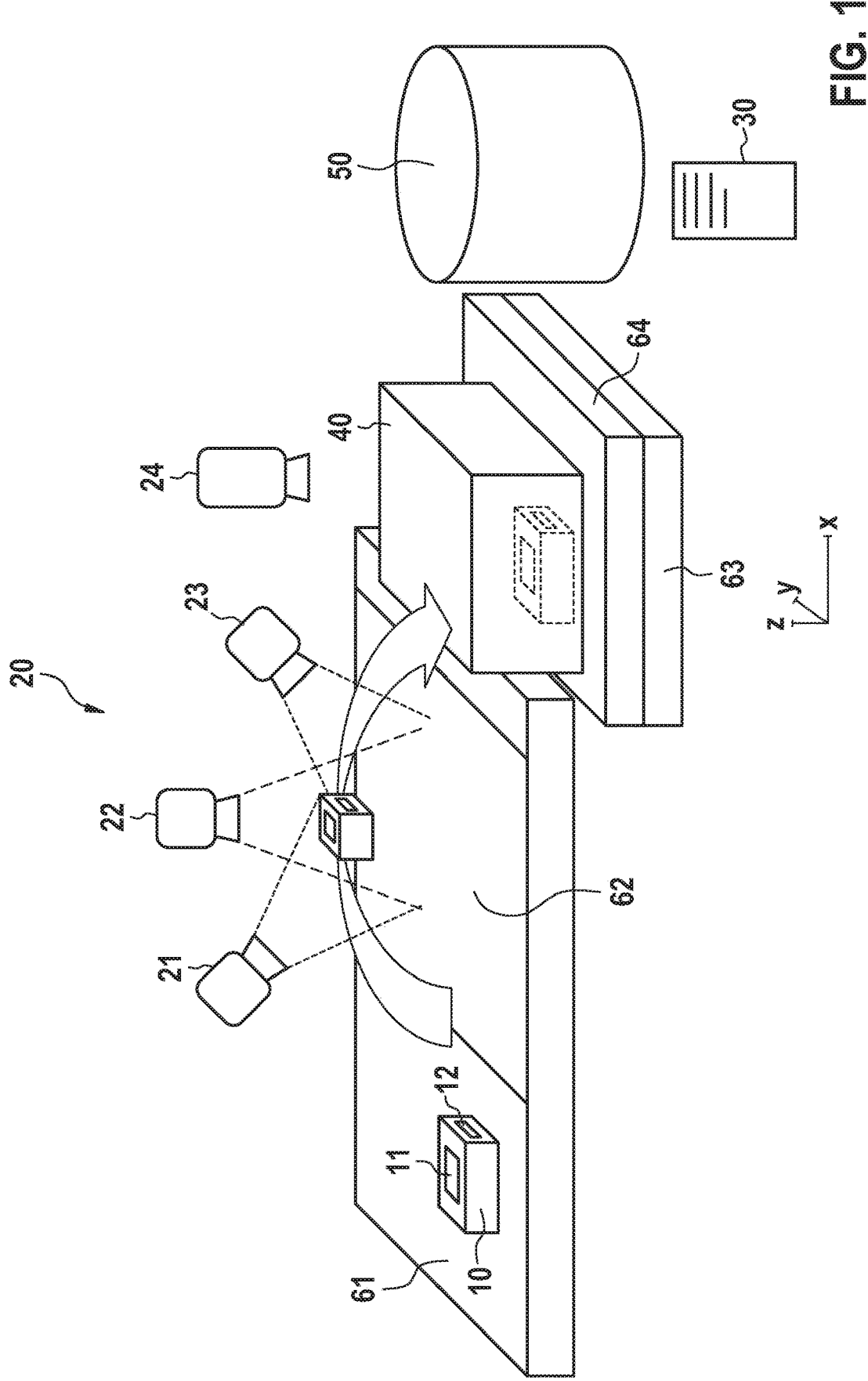
FIG. 1 shows a schematic representation of a picking workstation at which a method according to an exemplary embodiment of the present invention can be carried out.

At a picking work station shown in FIG. 1, an article 10 is to be packaged. Article 10 has a first label 11 on the upper side of its packaging, and a second label 12 is attached to one of the side surfaces of its packaging. For the monitoring of the packaging process, a camera system 20 is provided that is made up of four cameras 21 through 24. The first three cameras 21, 22, 23 are industrial cameras that are capable of recording up to 30 images per second, while fourth camera 24 is a depth camera. In a picking list 30, it is stated which sorts of articles 10, and which quantities of these articles, are to be packaged in a transport container 40. Picking list 30 is read in in an electronic control device 50 that controls the camera system, and on which a warehouse management system runs. Picking list 30 is thus an electronically readable data file that includes a list. The picking workstation has a deposit area 61 on which articles 10 can be put down before the packaging process. The first three cameras 21, 22, 23 are situated above a read area 62. A shipping employee takes each article 10 to be packaged from deposit area 61, moves it through read area 62, and places it in transport container 40. Transport container 40 is situated in a lower-positioned transport area 63, on a scale 64, above which fourth camera 24 is positioned. When article 10 is moved through read area 62, it reaches the record area of the first three cameras 21, 22, 23. When article 10 is placed in transport container 40, it is situated in the record area of fourth camera 24.

Figure 2:
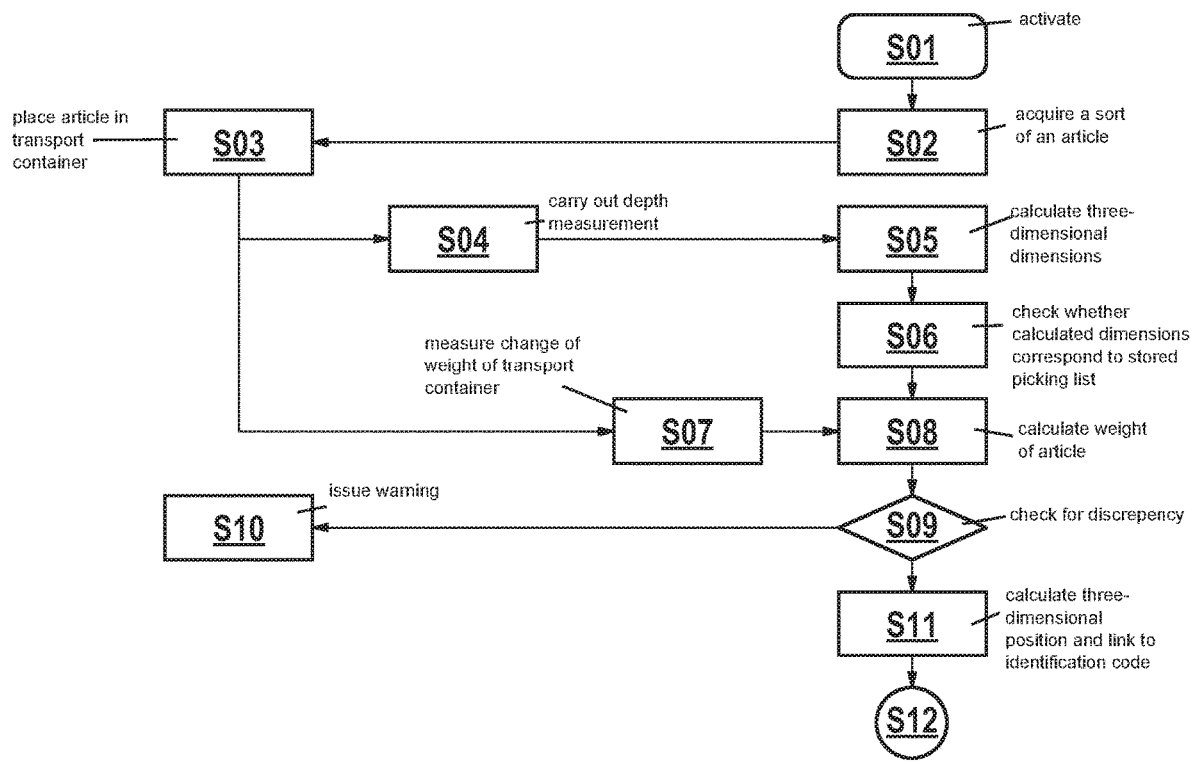
FIG. 2 shows a flow diagram of a part of a method according to an exemplary embodiment of the present invention.

In an exemplary embodiment of the method according to the present invention, whose first part is shown in FIG. 2, method steps are carried out by a shipping employee, by camera system 20, by scale 64, and by electronic control device 50. In order to illustrate this division of work tasks, in FIG. 2 the method steps are grouped in four columns. The left column shows the method steps of the shipping employee, the following column shows the method steps of camera system 20, the next column shows the method steps of scale 64, and the right column shows the method steps of electronic control device 50. After a start of the method in a step S01, in which a computer program in electronic control device 50 is activated, in a step S02 the sort is acquired of an article 10 that is to be placed in a transport container 40. In the present context, this takes place in that the shipping employee takes article 10 from deposit area 61 and moves it through read area 62. Here images of article 10 are recorded by the first three cameras 21, 22, 23 of camera system 20, and these images are forwarded to electronic control device 50. In electronic control device 50, all the images are selected in which at least one label 11, 12 is completely contained and whose sharpness has a specified minimum value. From these images, the content of the label is read and is compared with specified label contents from picking list 30, which was previously read in in electronic control device 50. In this way, article 10 is identified. In another exemplary embodiment (not shown) of the method according to the present invention, instead of the first three cameras 21, 22, 23 of camera system 20, a barcode scanner may also be provided over which the shipping employee moves one of the labels 11, 12 of article 10 so that this article can be identified on the basis of a barcode.

In a step S03, the shipping employee places article 10 in transport container 40. There, in a step S04, using fourth camera 24 an image that shows the upper side of article 10 is recorded, and a depth measurement of article 10 is carried out. This information is sent to electronic control device 50, and this control device calculates, in a step S05, the three-dimensional dimensions of article 10, designated x, y, z in FIG. 1. In a step S06 it is checked whether dimensions x, y, z correspond to the dimensions of article 10 stored in picking list 30, or to a multiple of these dimensions. If this is the case, then the number of articles 10 placed in transport container 40 is calculated from the dimensions x, y, z, and in control device 50 a counter for the sort of this article is correspondingly incremented upward. The new value of the counter is here compared to a maximum value that indicates the required total quantity of this article sort.

Simultaneously with steps S04 through S06, in a step S07 a change in weight of transport container 40 is measured using scale 64. In a step S08, this is compared, in an electronic control device 50, with a weight last stored there of transport container 40, in order to calculate the weight of article 10 from the difference in these values. This weight is compared with a specification for the present article sort.

In the next step S09, it is checked whether, in one of steps S06 or S08, a discrepancy with a specification was recognized, i.e. whether the dimensions x, y, z do not correspond to the specification for the present article sort, the counter for the article number was set to a value that exceeds the required maximum number, or it was determined that the weight of the placed article does not match the specification. If one of these cases is present, a warning is issued to the shipping employee, for example by electronic control device 50, so that, in a step S10, the employee can remove article 10 from transport container 40. Otherwise, in a step S11, from the data acquired by fourth camera 24 in step S04 a three-dimensional position of article 10 in transport container 40 is calculated and is linked with an identification code for this article 10. With this, the packaging of article 10 is concluded, and it is registered in transport container 40. In a step S12 there then takes place a transition to a second part of the method according to the present invention, which provides monitoring of article 10 in transport container 40.

Figure 3:
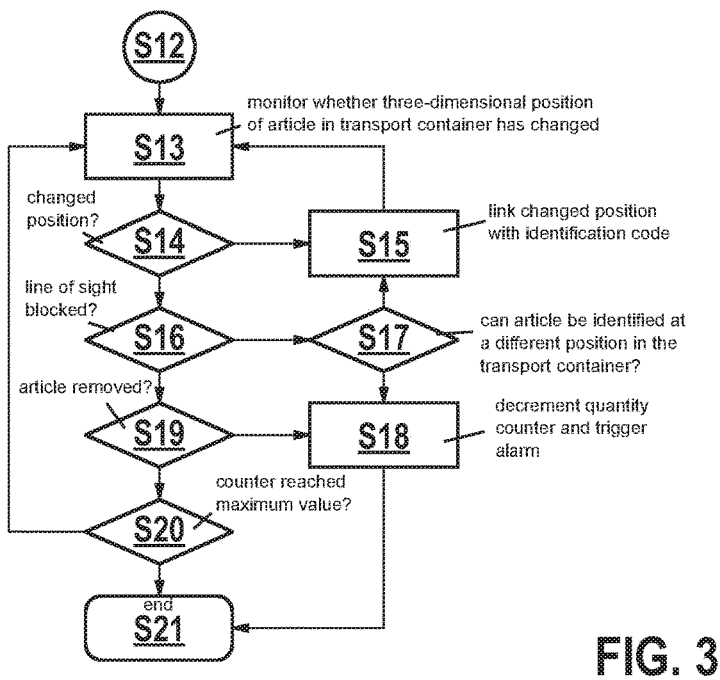
FIG. 3 shows a flow diagram of another part of a method according to an exemplary embodiment of the present invention.

This second part of the method is shown in FIG. 3. In a step S13, using fourth camera 24 it is continuously monitored whether the three-dimensional position of article 10 in transport container 40 has changed relative to the position linked with its identification code. If, in a step S14, it is determined that such a change of position has taken place, then in a step S15 the changed position is linked with the identification code, and the further monitoring, in step S13, takes place on the basis of the assumption that article 10 is now to be situated at this changed position. If, during the monitoring, it is determined in a step S16 that a different object, which may for example be a hand of the shipping employee or another article 10, is blocking the line of sight between fourth camera 24 and the acquired three-dimensional position, then waiting takes place until the line of sight is again free, and it is then checked whether article 10 is still in its last-acquired position. If this is not the case, then, in a step S17, it is checked whether article 10 can be identified at a different position in transport container 40, on the basis of the recorded image of its upper side and on the basis of its three-dimensional dimensions. If this is the case, then in step S15 the new position is linked with the identification code of article 10, and the monitoring continues in step S13. If, using fourth camera 24, a new position of article 10 cannot be successfully ascertained, and in addition scale 64 indicates a reduction in weight of transport container 40, then in step S18 it is recognized that article 10 has been removed from transport container 40. In this case, the quantity counter for this article sort is decremented by one, and a theft alarm is triggered. If, in a step S19, a removal of article 10 from transport container 40 is observed by camera 24, then here as well the measures of step S18 are introduced. Otherwise, the monitoring of transport container 40 for each of the articles 10 registered therein according to FIG. 3 is continued until, in a step S20, it is recognized that the counter for all article sorts to be packed has reached its maximum value, and the packaging process is thus concluded. In this case, the method ends in a step S21. If in step S18 a removal of an article 10 is recognized, the method for this individual article 10 also ends in step S21. For all other articles, the method steps in FIG. 3 continue to run.

Figure 4:
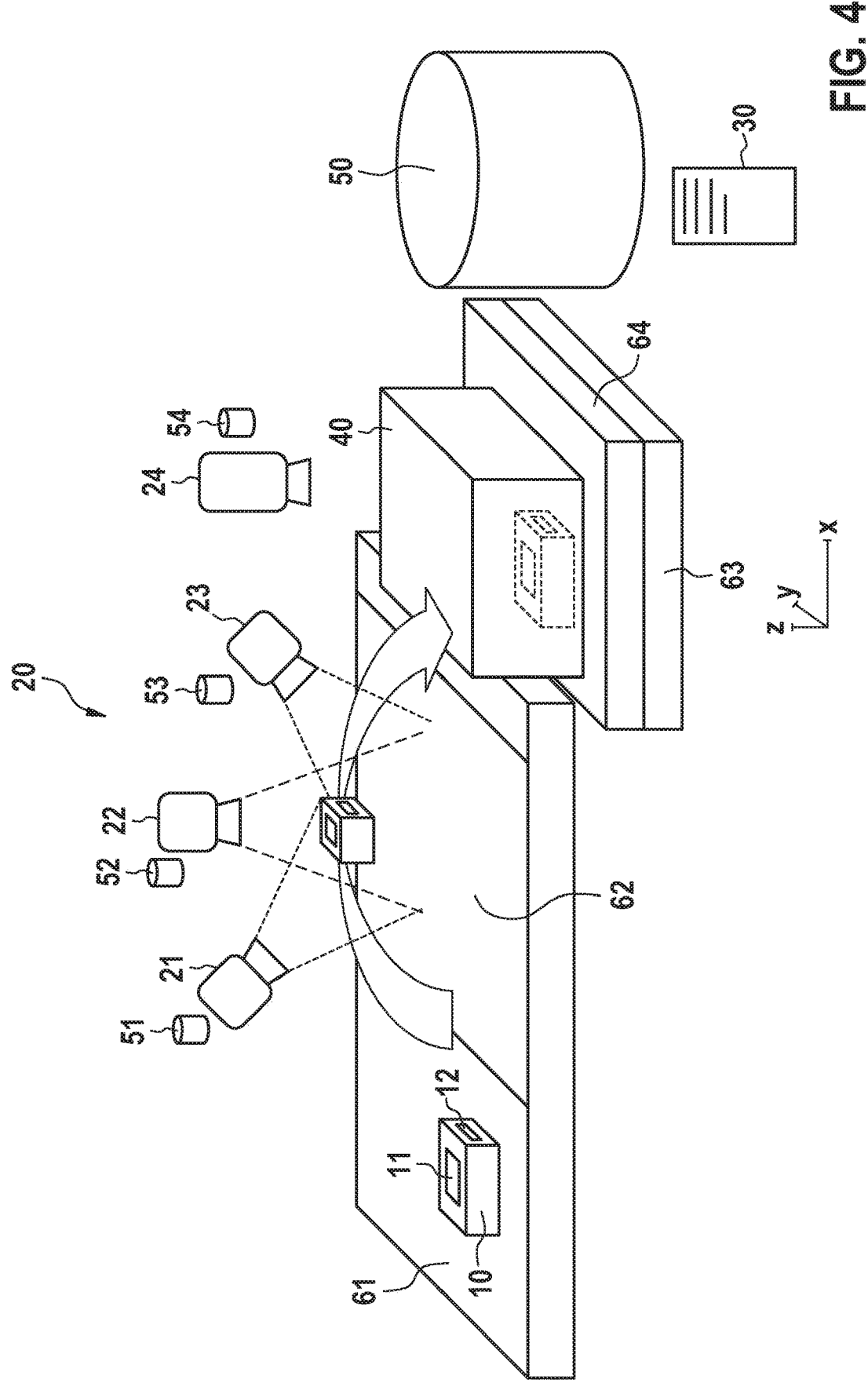
FIG. 4 schematically shows another picking workstation at which a method according to an exemplary embodiment of the present invention can be carried out.
Figure 5:
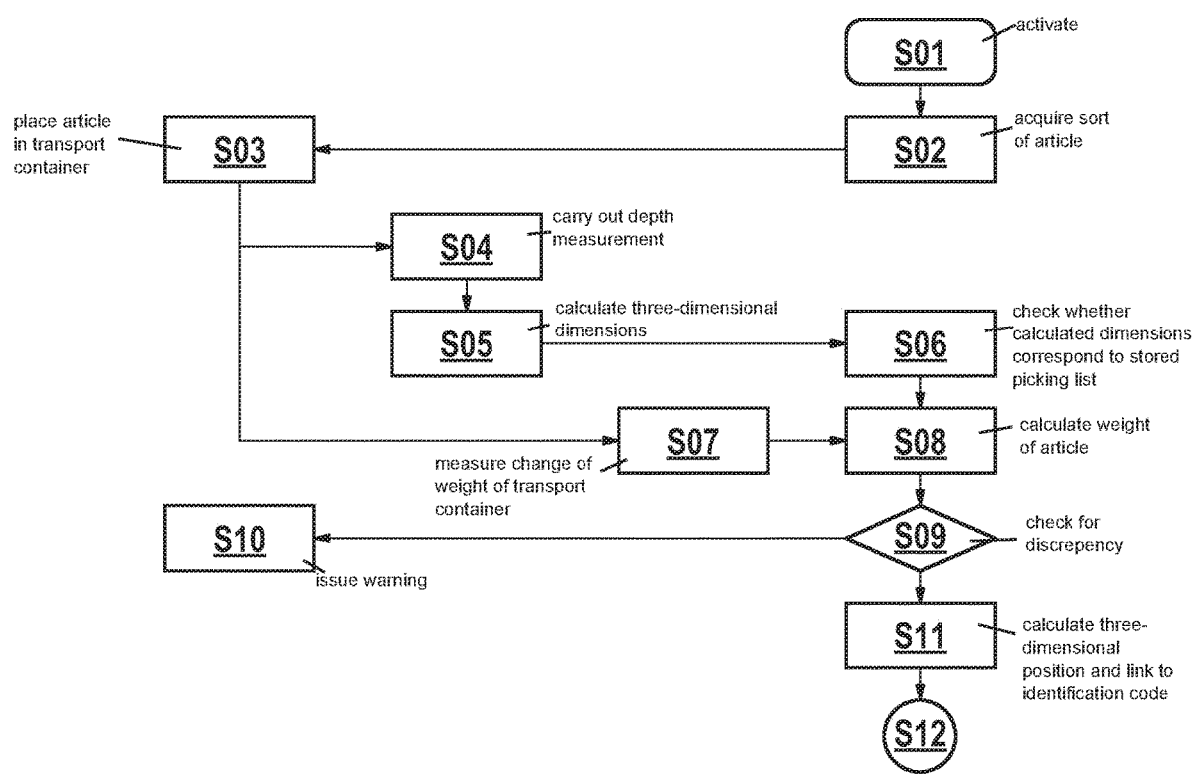
FIG. 5 shows a flow diagram of a part of another exemplary embodiment of the method according to the present invention.

In a second exemplary embodiment of the method, cameras 21 to 24 of camera system 20 each have computing devices 51 to 54. These computing devices have filters and image stabilization systems. This is shown in FIG. 4. Here, the sequence of the method changes as shown in FIG. 5. Step S05 is now no longer carried out in electronic control device 50, but rather in computing device 54 of fourth camera 24. Here, further information, such as timestamp, copyright, hash value, and image name, is also stored in image data files. Because step S05 is already carried out in camera system 20, the load on the network (not shown) between camera system 20 and electronic control device 50 is reduced.

What is claimed is:

1. A method for monitoring a packaging process of at least one article, comprising the following steps:
   a) acquiring a sort of an article before the article is placed in a transport container;

b) recording at least one image of the article and at least one depth measurement of the article after the article is placed in the transport container;
c) calculating three-dimensional dimensions of the article;
d) comparing the calculated dimensions of the article with a specification for the acquired sort of the article;
e) issuing a warning based on the calculated dimensions of the article not agreeing with the specification;
f) acquiring a three-dimensional placement position of the article in the transport container and linking the acquired position with an identification code;
g) continuously monitoring, by at least one camera, the placement position of the article; and
h) linking a changed position of the article with the identification code when there is a change in the placement position of the article.

2. The method as recited in claim 1, further comprising the following steps:
ascertaining a quantity of the article from the calculated dimensions; and
comparing the ascertained quantity of the article with a specification.

3. The method as recited in claim 1, further comprising the following steps:
measuring a weight of the transport container before and after the placement of the article in the transport container; and
comparing a difference in the measured weights with a specification for the sort of the placed article.

4. A method for monitoring a packaging process of at least one article, comprising the following steps:
a) acquiring a sort of an article before the article is placed in a transport container;
b) recording at least one image of the article and at least one depth measurement of the article after the article is placed in the transport container;
c) calculating three-dimensional dimensions of the article;
d) comparing the calculated dimensions of the article with a specification for the acquired sort of the article;
e) issuing a warning based on the calculated dimensions of the article not agreeing with the specification;
f) acquiring a three-dimensional placement position of the article in the transport container and linking the acquired position with an identification code;
g) carrying out a check of whether the article is still at the placement position linked with the identification code after a line of sight between the article and the at least one camera has been temporarily interrupted.

5. A method for monitoring a packaging process of at least one article, comprising the following steps:
a) acquiring a sort of an article before the article is placed in a transport container;
b) recording at least one image of the article and at least one depth measurement of the article after the article is placed in the transport container;
c) calculating three-dimensional dimensions of the article;
d) comparing the calculated dimensions of the article with a specification for the acquired sort of the article;
e) issuing a warning based on the calculated dimensions of the article not agreeing with the specification;
f) acquiring a three-dimensional placement position of the article in the transport container and linking the acquired position with an identification code;
g) continuously monitoring, by at least one camera, the placement position of the article; and
h) issuing a communication to a warehouse management system when the article is removed from the transport container.

6. A non-transitory machine-readable storage medium on which is stored a computer program for monitoring a packaging process of at least one article, the computer program, when executed by computer, causing the computer to perform the following steps:
a) acquiring a sort of an article before the article is placed in a transport container;
b) recording at least one image of the article and at least one depth measurement of the article after the article is placed in the transport container;
c) calculating three-dimensional dimensions of the article;
d) comparing the calculated dimensions of the article with a specification for the acquired sort of the article;
e) issuing a warning based on the calculated dimensions of the article not agreeing with the specification
f) acquiring a three-dimensional placement position of the article in the transport container and linking the acquired position with an identification code;
g) continuously monitoring, by at least one camera, the placement position of the article; and
h) linking a changed position of the article with the identification code when there is a change in the placement position of the article.

7. An electronic control device configured to monitor a packaging process of at least one article, the electronic control device configured to:
a) acquire a sort of an article before the article is placed in a transport container;
b) record at least one image of the article and at least one depth measurement of the article after the article is placed in the transport container;
c) calculate three-dimensional dimensions of the article;
d) compare the calculated dimensions of the article with a specification for the acquired sort of the article; and
e) issue a warning based on the calculated dimensions of the article not agreeing with the specification; f) acquiring a three-dimensional placement position of the article in the transport container and linking the acquired position with an identification code;
g) continuously monitoring, by at least one camera, the placement position of the article; and
h) linking a changed position of the article with the identification code when there is a change in the placement position of the article.

8. A monitoring system for monitoring a packaging process of at least one article, comprising:
a camera system at least one camera that has a depth sensor; and
an electronic control device configured to:
a) acquire a sort of an article before the article is placed in a transport container;
b) record, using the camera system, at least one image of the article and at least one depth measurement of the article after the article is placed in the transport container;
c) calculate, using the camera system, three-dimensional dimensions of the article;
d) compare the calculated dimensions of the article with a specification for the acquired sort of the article; and
e) issue a warning based on the calculated dimensions of the article not agreeing with the specification f) acquiring a three-dimensional placement position of the article in the transport container and linking the acquired position with an identification code;
g) continuously monitoring, by at least one camera, the placement position of the article; and
h) linking a changed position of the article with the identification code when there is a change in the placement position of the article.

\* \* \* \* \*